United States Patent [19]

Buysch et al.

[11] 4,116,932

[45] Sep. 26, 1978

[54] SYNTHETIC POLYMER COMPOSITIONS STABILIZED AGAINST DISCOLORATION AND DEGRADATION

[75] Inventors: Hans-Josef Buysch, Krefeld; Harald Oertel, Odenthal-Gloebusch; Ernst Roos, Odenthal-Osenau, all of Germany

[73] Assignee: Bayer Aktiengesellschaft, Leverkusen, Germany

[21] Appl. No.: 688,163

[22] Filed: May 20, 1976

[30] Foreign Application Priority Data

May 24, 1975 [DE] Fed. Rep. of Germany ....... 2523107

[51] Int. Cl.$^2$ ................................................ C08K 5/13
[52] U.S. Cl. ............................. 260/45.95 R; 521/117; 521/88
[58] Field of Search .................... 260/45.95 B, 2.5 BB

[56] References Cited

U.S. PATENT DOCUMENTS 3,190,852  6/1965  Doyle .............................. 260/45.85
3,778,409  12/1973  Oertel et al. ...................... 260/45.95
3,799,990  3/1974  Nast et al. ........................ 260/45.95

OTHER PUBLICATIONS

Belgian Derwent Report No. 83A/B pp. C66 and C67, published 6-1-61, item 604,516.

*Primary Examiner*—V. P. Hoke
*Attorney, Agent, or Firm*—Plumley and Tyner

[57] ABSTRACT

The invention relates to a synthetic polymer composition stabilized against light, heat and atmospheric influences comprising a polymer and from 0.01 to 10% by weight based on the quantity of the synthetic polymer, of a mixture of $\alpha,\alpha'$-bis-(2-hydroxy-3,5-dialkylphenyl)-m-diisopropyl benzene and $\alpha,\alpha'$-bis-(2-hydroxy-3,5-dialkylphenyl)-p-diisopropyl benzene, the mixture containing at least 20% by weight of the m-compound. The stabilized synthetic polymer compositions are used in various forms, e.g. in the form of fibres, filaments, yarns, sheetings, films, foils, latex, foam or coatings.

3 Claims, No Drawings

SYNTHETIC POLYMER COMPOSITIONS STABILIZED AGAINST DISCOLORATION AND DEGRADATION

This invention relates to synthetic polymer compositions which are stabilised against discoloration and degradation under the effect of visible and/or UV-light, heat and/or atmospheric influences by mixtures of α,α'-bis-(2-hydroxy-3,5-dialkyl phenyl)-p-diisopropyl benzene and α,α'-bis-(2-hydroxy-3,5-dialkyl phenyl)-m-diisopropyl benzene.

It is known from German OS No. 2,012,285 that α,α'-bis-(2-hydroxy-3,5-dialkyl phenyl)-p-diisopropyl benzenes suitable for stabilising polyurethanes can be obtained by reacting α,α'-dihydroxy-p-diisopropyl benzene with 2,4-dialkyl phenols in the presence of acid catalysts. By contrast, the production of these compounds from corresponding m-diisopropyl benzene derivatives and mixtures of m- and p-compounds has never been described before.

α,α'-Dihydroxy diisopropyl benzenes are obtained by oxidising diisopropyl benzenes with air. In the propylation of benzene, however, cumene, m- and p-diisopropyl benzene and more highly propylated benzenes are also formed. Whereas these more highly propylated benzenes and cumene are easy to separate from diisopropyl benzene, m- and p-diisopropyl benzene can only be separated from one another by distillation at considerable cost. Accordingly, p-diisopropyl benzene is much more expensive than the mixture of m- and p-diisopropyl benzene. Accordingly, there was a need to carry out tests to determine whether p-diisopropyl benzene could be replaced by mixtures of m- and p-diisopropyl benzene and, hence, to determine whether, ultimately, α,α'-bis-(2-hydroxy-3,5-dialkyl phenyl)-p-diisopropyl benzenes could be replaced by mixtures of the p- and corresponding m-compounds.

German OS No. 2,012,285 describes various strong acids, for example $H_3PO_4$, $H_2SO_4$, hydrochloric acid and p-toluene sulphonic acid, which may be used as catalysts for the reaction of α,α'-dihydroxy-p-diisopropyl benzene to form α,α'-bis-(2-hydroxy-3,5-dialkyl phenyl)-p-diisopropyl benzene. If mixtures of α,α'-dihydroxy-m- and -p-diisopropyl benzene are reacted with 2,4-dialkyl phenols by this process, irrespective of which of the abovementioned acids is used as catalyst, mixtures which are virtually impossible to be crystallised and which, for this reason, can only be purified at considerable cost are obtained in comparatively much poorer yields. However, purification is absolutely essential in this case because above all the crude products obtained with p-toluene sulphonic acid, the preferred catalyst according to the above-mentioned German OS, are deep brown in colour. Above all, however, the mixtures obtained in this way have a much weaker stabilising effect on synthetic polymer compositions, more especially polyurethanes, than the pure p-compounds.

The reaction of mixtures of α,α'-dihydroxy-m- and -p-diisopropyl benzene with 2,4-dialkyl phenols is surprisingly a high-yield reaction which gives light-coloured, readily crystallisable products when hydrogen chloride gas is used as catalyst.

Mixtures of this kind are eminently suitable for stabilising synthetic polymer compositions against degradation under the effect of light, heat and atmospheric influences.

Accordingly, the present invention relates to synthetic polymer compositions stabilised against light, heat and atmospheric influences comprising a polymer and from 0.01 to 10% by weight, based on the quantity of the synthetic polymer, of a mixture of α,α'-bis-(2-hydroxy-3,5-dialkyl phenyl)-m-diisopropyl benzene and α,α'-bis-(2-hydroxy-3,5-dialkyl phenyl)-p-diisopropyl benzene, the mixture containing at least 20% by weight of the m-compound. The stabilisers are preferably added in quantities of from 0.1 to 5% by weight and, with particular preference, in quantities of from 0.3 to 3% by weight.

It is preferred to use mixtures of α,α'-bis-(2-hydroxy-3,5-dimethyl phenyl)-p-diisopropyl benzene and α,α'-bis-(2-hydroxy-3,5-dimethyl)-m-diisopropyl benzene for stabilising synthetic polymer compositions. The proportion of the m-compound best amounts to between 40 and 70% by weight which also represents the preferred range.

The expression "synthetic polymer composition" covers the following substances and products: polyesters, such as polyethylene terephthalate and polybutylene terephthalate; copolyether esters of dihydroxy polytetrahydrofuran, terephthalic acid and ethylene glycol or 1,4-butane diol; polyamides, such as polyamide-6, polyamide-6,6 and polyamide-6, 10; polyolefins, including high-polymer olefins, such as polyethylene of both high and low density, polypropylene, polystyrene, polybutadiene, polyisoprene and the like, and copolymers of these olefins with other ethylenically unsaturated monomers, such as propylene-ethylene copolymers, ethylene-butylene copolymers, ethylene-vinyl acetate copolymers, styrene-butadiene copolymers, acrylonitrile-butadiene-styrene copolymers and the like; polyacetals such as polyoxymethylene and polyoxyethylene; polyethers, such as polytetrahydrofuran, polypropylene oxides, polyether oxides having terminal OH-groups and their derivatives, such as esters, urethanes and amides; polyvinyl chlorides and polyvinylidene chlorides, including the homopolymers of vinyl chloride and vinylidene chloride, vinyl chloride/vinylidene chloride copolymers and copolymers of vinyl chloride and vinylidene chloride with vinylacetate or other ethylenically unsaturated monomers; but especially polyurethanes.

The stabilised synthetic polymer compositions are used in various forms, for example in the form of fibres, filaments, yarns, sheeting, films, foils, latex, foam or coatings.

The stabiliser mixtures are used in particular for stabilising polyurethanes against discoloration and degradation under the effect of visible and/or UV-light, heat and/or atmospheric influences such as oxygen, nitrogen oxide and exhaust gases, especially in the case of filaments and films, including coatings.

The elastic polyurethanes to be stabilised, optionally in the form of foams, may be obtained by methods known per se from known starting materials. The polyurethanes are generally obtained by reacting polyhydroxy compounds of relatively high molecular weight (for example polyesters or polyethers having a molecular weight in the range from about 500 to 5000, melt products preferably below 60° C) and aliphatic, araliphatic or aromatic polyisocyanates (preferably aromatic diisocyanate, such as tolylene diisocyanate or diphenyl methane-4,4'-diisocyanate) and the so-called chain extenders, i.e. low molecular weight compounds (molecular weight for example from 18 to 400) containing two or more isocyanate-reactive groups (for example water, low molecular weight diols, diamines, dihydrazides or similar compounds such as, for example, amino alcohols, aminohydrazides, hydroxy hydrazides, aminosemicarbazides, semicarbazide hydrazides, semicarbazido carbazinic esters or corresponding mixtures of these chain extenders) either in the melt or in solvents by a variety of known and modifiable, single-stage or multistage processes.

Suitable starting materials are, for example, polyesters of adipic acid and dialcohols having 2 to about 10 carbon atoms, preferably those having more than 5 carbon atoms, the dialcohols also being useable in admixture in order to lower the melting points of the polyesters; polyesters of caprolactone and dialcohols, also polyalkylene ether diols, especially polytetramethylene ether diols, polytrimethylene ether diols, polypropylene glycol or corresponding copolyethers. Preferred diisocyanates are aromatic diisocyanates, such as diphenyl methane-4,4'-diisocyanate, tolylene diisocyanate, araliphatic diisocyanates, such as m-xylylene diisocyanate, or even aliphatic diisocyanates, such as hexamethylene diisocyanate and dicyclohexyl methane-4,4'-diisocyanate. These starting materials are reacted, optionally together with dialcohols, to form NCO-preadducts which preferably have the structures indicated in Belgian Patent Specification No. 734,194. Suitable chain extenders include, optionally in admixture or for reaction in stages, water and/or dialcohols or trialcohols, such as butane diol and p-xylylene glycols, trimethylol propane, amino alcohols such as ethanolamine, diamines such as diphenyl methane-4,4'-diamine, 3,3'-dichlorodiphenyl methane-4,4'-diamine, but preferably aliphatic diamines, such as ethylene diamine, 1,2-propylene diamine, isophorone diamine, meta-xylylene diamine, and hydrazine or dihydrazides such as carbodihydrazide, oxalic acid dihydrazide, glutaric acid dihydrazide, pimelic acid dihydrazide, terephthalic acid dihydrazide, β-alanyl hydrazide, or semicarbazide hydrazides, such as β-semicarbazide alanyl hydrazide. Mixtures of these chain extenders may optionally be used.

The mixtures according to the invention are preferably used for stabilising polyurethanes which, in addition to urethane groups, also contain —NH—CO—NH— groups formed by the reaction of isocyanate groups with water and/or compounds containing terminal NH$_2$—groups (for example diamines, dihydrazides, carbodihydrazide, semicarbazide hydrazides or hydrazine) and which have a substantially linear, segmented molecular structure, which are soluble before processing in highly polar solvents, such as dimethyl formamide or dimethyl acetamide, and whose characteristic segments may be represented by the following formula:

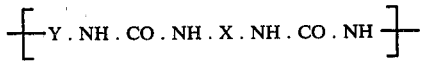

This segment may originate from the reaction of an NCO-preadduct OCN.Y.NCO with a chain extender H$_2$H.X.NH$_2$.

The radical —Y— of the NCO-preadduct may be built up for example as follows:

or may have other standard compositions (cf. Belgian Patent Specification No. 734,194).

In the above formula, R represents a divalent aliphatic, araliphatic or aromatic radical (of a diisocyanate), D represents the radical of a relatively high molecular weight of from 500 to 5000 and having a melting point below 60° C without its terminal hydroxyl groups (for example the radical of a polyalkylene ether, polyester, polyacetal, poly-N-alkyl urethane). X is the radical of a divalent terminal NH$_2$-group containing chain extender without the terminal NH$_2$-groups, for example an aliphatic, araliphatic, aromatic or heterocyclic radical, an —HN—CO— alkylene—CO—NH—radical, an —NH—CO—NH—(CH$_2$)$_2$—CO—NH—radical or a bond between two N-atoms. The synthesis of polyurethane (urea) of this kind is described in detail, for example in German Auslegeschrift No. 1,270,276, and in Belgian Patent Specification No. 734,194. Polyurethane foams can be produced, for example with the stabilisers added to the starting components (for example polyethers), by known methods and in accordance with known recipes (cf. for example Kunststoff-Handbuch, Vol. VII, Polyurethane, Carl Hanser Verlag, Munich, 1966, pages 440 to 457 and 504 to 531).

The stabilisers may be incorporated in the polyurethanes by any methods suitably adapted to meet the particular processing requirements. One very simple method of incorporation is to add the stabilisers, optionally in solution, to solutions of the polyurethanes, for example to the solutions in highly polar solvents, for example dimethyl formamide or dimethyl sulphoxide, which are preferably used for spinning, coating and coagulating purposes. However, the stabilisers may also be worked into the melts or plasticised polyurethane sheets by means of suitable mixers, such as kneaders or rollers. In the case of elastomeric filaments, the stabilisers may be applied to the surface, optionally together with the preparations used.

Another possible method of incorporation is to add the stabilisers to the starting materials used for synthesising the polyurethanes. Thus, the bisphenol compounds are soluble in the relatively high molecular weight polyhydroxyl compounds (for example polyesters or polyethers). Stabiliser-containing polyesters or polyethers of this kind may then be used for corresponding polyurethane syntheses, for example for the production of foams or elastomers. The stabilisers may even be added to the diisocyanates or to NCO-preadducts formed from relatively high molecular weight polyhydroxyl compounds and (excess molar quantities of) diisocyanates before the polyurethane is formed, for example by spinning into aqueous diamine solutions. By using the stabilisers in the reaction of NCO-preadducts with chain extenders, such as diamines, hydrazine, hydrazides or similar chain extenders, in highly polar solvents, such as dimethyl formamide or dimethyl acetamide, it is even possible to prevent the polyurethanes from discoloring during their actual synthesis. The stabilisers are added in quantities of from 0.01 to 10% by weight and preferably in quantities of from 0.3 to 3.0% by weight.

By adding the stabilisers to polyurethanes which contain reaction components with tertiary, aliphatically substituted amino groups in quantities of from 0.02 to 1 mol and preferably in quantities of from 0.05 to 0.3 mol per kg of elastomer substance, it is possible further to improve the light-stabilising effect. Suitable reaction components of this type are, for example, glycols, diamines, dihydrazides or polyesters or polyethers with tertiary amino groups, for example N,N-bis-(β-hydroxy propyl)-methyl amine, N,N'-bis-(β-hydroxyethyl)-piperazine, N,N'-dimethyl-N,N'-bis-(γ-aminopropyl)-ethylene diamine, N,N'-bis-(γ-aminopropyl)-piperazine or polyethers containing tertiary amino groups or polyesters containing tertiary amino groups produced from dialcohols containing tertiary amino groups.

The readily crystallisable mixtures of α,α'-bis-(2-hydroxy-3,5-dialkyl phenyl)-m-diisopropyl benzenes and α,α'-bis-(2-hydroxy-3,5-dialkyl phenyl)-p-diisopropyl benzenes, are obtained by reacting a mixture of α,α'-dihydroxy-m- and -p-diisopropyl benzenes with 2,4-dialkyl phenols in excess in the presence of hydrogen chloride which is not bonded to water.

The process for producing the stabilisers may be carried out either continuously or in batches. In one simple, preferred embodiment of this process, α,α'-dihydroxy diisopropyl benzene is dissolved or suspended in dialkyl phenol and hydrogen chloride is introduced into the resulting mixture. However, it is also possible to introduce a solution of α,α'-dihydroxy diisopropyl benzene in 2,4-dialkyl phenol into a saturated solution of hydrogen chloride in the same dialkyl phenol. For continuous working, the reactants are mixed and the reaction carried out, for example, in a residence-time zone, in the form of a tube reactor, adjoining the mixing unit.

The reaction has to be carried out with an excess of 2,4-dialkyl phenol. The molar ratio of α,α'-dihydroxy diisopropyl benzene to dialkyl phenol should amount to at least 1:3 and preferably to between 1:5 and 1:12. Solvents which are inert under the reaction conditions, such as methylene chlorides, chloroform, benzene, toluene, xylene, chlorobenzene and petrol, may also be used, although their presence is not absolutely essential.

Hydrogen chloride has to be used in such a quantity that it is freely available in the reaction mixture in more than the proportion which is bonded to hydrochloric acid by the water of reaction. If this is not the case, the hydrochloric acid determines the course of the reaction which, in this event, does not of course lead to the products required in the present case. The simplest way of meeting this requirement is to saturate the reaction mixture with hydrogen chloride.

The reaction temperature is not especially critical and may be in the range from about 0° to 100° C and preferably in the range from 20° to 70° C. Lower temperatures have an adverse effect upon the reaction velocity, whilst higher temperatures promote secondary reactions.

Working-up of the reaction products is simple and may be carried out by distilling off excess dialkyl phenol from the reaction mixture. The sump product obtained is frequently pure enough to be directly used as a stabiliser. For further purification, it is recrystallised from a suitable solvent.

However, the solvent may also be added right at the beginning, the excess acid washed out with water at elevated temperature on completion of the reaction, the reaction product left to cool and the crystalline material collected. The mother liquor may optionally be directly re-used.

Suitable starting products for the process are, on the one hand, mixtures of α,α'-dihydroxy-m- and -p-diisopropyl benzenes which contain at least 20% by weight and preferably 40 to 70% by weight of the m-compound, and on the other hand 2,4-dialkyl phenols which may be substituted, for example, by ethyl, n-propyl, isopropyl, n-butyl, sec.-butyl, amyl, isoamyl, hexyl, isohexyl, isooctyl, isononyl, 4-methyl cyclohexyl, α-methyl cyclohexyl, benzyl, α-methyl benzyl or α,α-dimethyl benzyl radicals, but especially by methyl, tert.-butyl, cyclopentyl or cyclohexyl radicals. It is preferred to use 2,4-dialkyl phenols of the type which carry the methyl group in the p-position.

As already mentioned, the stabiliser mixtures and α,α'-bis-(2-hydroxy-3,5-dialkyl phenyl)-m-diisopropyl benzenes have never been described before. It had not been expected from the properties of the pure p-compounds that the mixtures would have the advantages referred to above. On the contrary, it had been expected, from the above-mentioned investigations into mixtures produced in accordance with German OS No. 2,012,285 that the stabilising effect would be considerably impaired by the presence of m-compounds and that mixtures would not be of any interest so far as practical application is concerned.

Accordingly, it must be regarded as extremely surprising that the stabiliser mixtures used should have such an outstanding property level. Firstly, it is surprising that low yields of mixtures of inadequate quality are obtained, almost without exception, with all the catalysts mentioned in German OS No. 2,012,285, even with hydrochloric acid which differs least from the catalyst according to the invention. It had been expected that α,α'-dihydroxy-p-diisopropyl benzene as starting material would also give a product with improved properties in the presence of hydrogen chloride. Surprisingly this is not the case. In terms of yield and quality, the bisphenol obtained is no different from that obtained with other catalysts. However, this means that hydrogen chloride only occupies a special position in regard to the mixtures.

Although it is known from Belgian Pat. No. 614,663 that α,α'-bis-(4-hydroxy phenyl)-diisopropyl benzenes can be synthesised from α,α'-dihydroxy diisopropyl benzenes with the aid of hydrogen chloride, the hydrogen chloride is mentioned as one of a number of catalysts which may be used equally successfully. Nor is there any reference to the fact that the conditions prevailing during the alkylation of 2,4-substituted phenols are the same as those which prevail in the alkylation of phenols having an unoccupied p-position, and certainly not the fact that mixtures of α,α'-dihydroxy-m- and -p-diisopropyl benzene would behave anomalously.

The stabiliser mixtures used in accordance with the invention are at least equivalent in their stabilising qualities to the pure p-compounds. However, they are superior to them in other properties. By virtue of their greater solubility, they may be incorporated more readily into synthetic polymer compositions, more especially polyurethanes, and do not crystallise out from them, as has occasionally been observed in the case of p-compounds. Solid-phase separation of this kind adversely effects the surface gloss of articles of, for example, polyurethanes which is particularly troublesome in the case of fibres in view of their large surface area.

The stabilisers according to the invention may be combined with other stabilisers of the type commonly used for stabilising polymers, for example with phenolic antioxidants, UV-absorbers, special light stabilisers, such as N,N-dialkyl hydrazide derivatives, tertiary amines, derivatives of 2,2,6,6-tetramethyl piperidine, polymeric additives such as poly-N,N-dialkyl-($C_1$-$C_7$)-aminoalkyl esters of methacrylic acid and other compounds of the type described, for example, in German OS No. 2,402,636.

In the following Examples "parts" are parts on weight basis.

The following Examples are to further illustrate the invention without limiting it.

Comparison Example 1

This Example shows that p-toluene sulphonic acid as catalyst gives good yields of bisphenol with $\alpha,\alpha'$-dihydroxy-p-diisopropyl benzene but poor yields of bisphenol with an isomer mixture.

a. A solution of 1164 g (6 mols) of $\alpha,\alpha'$-dihydroxy-p-diisopropyl benzene in 5490 g (45 mols) of 2,4-dimethyl phenol is added dropwise with stirring over a period of 9 to 10 hours at 150° C in a nitrogen atmosphere to a solution of 1830 g (15 mols) of 2,4-dimethyl phenol. At the same time, about 200 to 210 g of water distilled over. The reaction mixture is stirred for 15 minutes, the catalyst is neutralised with 6.5 g of soda and freed from 2,4-dimethyl phenol under reduced pressure up to a sump temperature of 140° C/12 Torr. This leaves a light, crystallising residue of 2230 g (93% of the theoretical). The recrystallisation of 100 g from 150 ml of tetrachloroethane gives $\alpha,\alpha'$-bis-(2-hydroxy-3,5-dimethyl phenyl-p-diisopropyl benzene in a yield of 80% (melting point 179° C).

b. The procedure is the same as in (a) above, but using a mixture of approximately 60% of $\alpha,\alpha'$-dihydroxy-m- and approximately 40% of -p-diisopropyl benzene. The removal of excess 2,4-dimethyl phenol by distillation leaves 1410 g (59% of the theoretical) of a dark brown resin which does not crystallise and cannot be recrystallised, even by treatment with various solvents (tetrachloroethane, toluene, xylene and white spirit).

Comparison Example 2

Even with phosphoric acid and hydrochloric acid, poor yields are obtained where an isomer mixture of $\alpha,\alpha'$-dihydroxy diisopropyl benzene is used.

a. The procedure is again as in Comparison Example 1, except that 25 g of concentrated phosphoric acid are added instead of the p-toluene sulphonic acid, and the catalyst neutralised with the corresponding quantity of base on completion of the reaction. This leaves only 950 g (37% of the theoretical) of a light resin which cannot be crystallised.

b. The mixture and procedure differ from Comparison Example 1 in the following respects: 400 g of 20% hydrochloric acid are used instead of p-toluene sulphonic acid. The condensation temperature is kept at 90° to 95° C on account of the boiling point of the hydrochloric acid, and no water is distilled off. On completion of the reaction, hydrochloric acid and dimethyl phenol are distilled off without neutralisation beforehand: 1395 g (58% of the theoretical) of a light brown, non-crystallisable resin.

EXAMPLE 1

This Example demonstrates that, in the case of the isomer mixture of $\alpha,\alpha'$-dihydroxy diisopropyl benzene, hydrogen chloride produces a far greater improvement in the yield and quality of the reaction product by comparison with conventional catalysts, but does not differ from the other catalysts in the case of $\alpha,\alpha'$-dihydroxy-p-diisopropyl benzene.

a. A solution of 194 g (1 mol) of a mixture of approximately 60% by weight of $\alpha,\alpha'$-dihydroxy-m- and approximately 40% by weight of -p-diisopropyl benzene in 611 g of 2,4-dimethyl phenol is added dropwise with stirring over a period of 1 hour to 611 g (5 mols) of 2,4-dimethyl phenol saturated with hydrogen chloride at 50° C. During the dropwise addition, hydrogen chloride is introduced in a quantity sufficient to keep the reaction mixture saturated, and the temperature is kept between 50° and 60° C. After another 2 hours under these conditions, hydrogen chloride, hydrochloric acid and excess 2,4-dimethyl phenol are distilled off in a water-jet vacuum up to a sump temperature of 180°-190° C. A yellow oil is obtained in a yield of 384 g (95.5% of the theoretical). It solidifies on cooling. Recrystallisation from 1.6 liters of white spirit leaves 322 g (80% of the theoretical) of colourless crystals (melting point: 135°-179° C).

b. The procedure is as in Example 1a), except that $\alpha,\alpha'$-dihydroxy-p-diisopropyl benzene is used instead of the isomer mixture. A gross yield of 372 g (93% of the theoretical) is obtained. After recrystallisation, the yield amounts to 320 g or 80% of the theoretical. The yields of Example 1b) correspond to those of Example 1a), in other words hydrogen chloride and p-toluene sulphonic acid have the same effect on the final analysis.

The pure m-compound, $\alpha,\alpha'$-bis-(2-hydroxy-3,5-dimethyl phenyl)-m-diisopropyl benzene, has a melting point of 190° to 191° C.

On the basis of analysis by gas chromatography, the isomer ratio of the product produced in accordance with Example 1 corresponds to that of the bis-carbinol used.

EXAMPLE 2

A solution of 97 g (0.5 mol) of m/p-bis carbinol (isomer ratio 3:2) in 382 g (2 mols) of o-cyclohexyl-p-cresol is added dropwise with stirring over a period of 6 hours to a mixture of 382 g (2 mols) of o-cyclohexyl-p-cresol and 350 ml of toluene which has been saturated with hydrogen chloride at room temperature. During the dropwise addition, the addition of HCl is continued and the reaction temperature kept at 20° to 22° C. After standing overnight, the reaction mixture is heated to 50°-60° C and HCl, hydrochloric acid and excess cyclohexyl cresol subsequently distilled off in vacuo, leaving a 240 g, i.e. 89% of the theoretical of a light residue, which crystallises on the addition of methanol: 170 g (melting point: 153°-172° C). The phenolic OH-content amounts to 6.2% (calculated 6.3%).

EXAMPLE 3

97 g (0.5 mol) of m/p-bis carbinol are reacted with 656 g (4 mols) of 2-tert.-butyl-p-cresol in the same way as described in Example 2, but in the presence of only 100 ml of toluene. Removal of the volatile constituents, especially excess butyl cresol, by distillation leaves 239 g, i.e. 98% of the theoretical, of a light residue which crystallises on the addition of white spirit: 195 g (melting point: 130°-144° C), phenolic OH 7.1% (calculated 7.0%). At 6.5:3.5, the isomer ratio corresponds to that of the bis carbinol used within the limits of error.

EXAMPLE 4

1200 parts of a co-polyester of adipic acid, 1,6-hexane diol and 2,2-dimethyl-1,3-propane diol (molar ratio of the diols 65:35) (molecular weight of the co-polyester 1950), 23.55 parts of N-methyl-bis-($\beta$-hydroxy propyl)-amine, 342.65 parts of diphenyl methane-4,4'-diisocyanate and 393 parts of anhydrous dimethyl formamide, are heated for 80 minutes at 45° to 50° C, resulting in formation of the NCO-pre-polymer with an NCO-content of 3.06% (based on the solid substance). (The polymer contains approximately 100 mVal of tertiary amino groups per kg.)

70 parts of dry ice ($CO_2$) are added to 28.3 parts of 99.5% ethylene diamine in 3392 parts of dimethyl formamide to form a fine carbamate suspension, followed by the introduction over a period of 4 minutes of 1590 parts of the above-mentioned NCO-prepolymer solution. The solution is pigmented by the addition of 4% of $TiO_2$ (rutile) (viscosity: 1230 poises/20° C). The solution is then diluted with more dimethyl formamide to a solids concentration of 22.8%/540 poises. The stabilisers are added to proportions of the solutions each dissolved in a little dimethyl formamide.

The solutions are each dry-spun through a 16-bore spinneret (bore diameter 0.2 mm), run off from the spinning duct at 100 meters per minute and wound into package form at 130 meters per minute. The filaments were prepared with talcum.

Measurements were carried out on filaments which had been tempered for 1 hour at 130° C (cf. Table 1).

The influence of the stabilisers upon the thermal properties of these filaments is shown in Table 2.

Some of the dry-spun filaments were subjected to a heat-stability test and the degradation of molecular weight was measured as the $\eta_i$-value $$(\eta_i = \frac{ln\eta R}{C}$$

where $\eta_R$ = relative viscosity
C = concentration in g/100 ml of hexamethyl phosphoramide Measuring temperature 25° C) (cf. Table 1).

The stabilised filaments remained colourless during the heat-stability test at 180° C. (In the following Tables, tensile strengths are expressed in g/dtex and elongation at break in %).

Table 1

Heat stabilising effect of the additives in dry-spun filaments

| $\eta_i$-values:original | after 30 secs/18° C | after 180 secs/180° C |
|---|---|---|
| no addition | 1.10 | 1.09 (Δ−0.9%) | 0.99 (Δ−10%) |
| +2% of stabiliser 1a | 1.10 | 1.10 (Δ+0%) | 1.052 (Δ−4.4%) |

Table 1-continued

Heat stabilising effect of the additives in dry-spun filaments

| $\eta_i$-values:original | after 30 secs/18° C | after 180 secs/180° C |
|---|---|---|
| +1% of stabiliser 1a +1% of UV-stabiliser-B (Tinuvin 327-Ciba/Geigy) | 1.10 | 1.11 (Δ+0.9%) | 1.048 (Δ−4.8%) |
| +1.5% of stabiliser 1a +1% of UV-stabiliser-B (Tinuvin 327 Ciba/Geigy) | 1.10 | 1.09 (Δ−0.9%) | 1.050 (Δ−4.5%) |
| +1% of stabiliser 1a +1% of UV-stabiliser-C | 1.10 | 1.11 (Δ0.9%) | 1.052 (Δ−4.4%) |

Table 2

Influence of the stabilisers upon the thermal properties of dry-spun elastomeric filaments

| | Tensile strength | Elongation at break | Heat distortion temperature (° C) (a) | Time-to-breakage under heat (seconds) (b) |
|---|---|---|---|---|
| no addition | 0.61 | 490 | 183.5 | 60.6 |
| + 1% of stabiliser 1a | | | | |
| + 1% of UV-stabiliser-B | 0.62 | 535 | 188.5 | 61.0 |
| + 1.5% of stabiliser 1a | | | | |
| + 0.5% of UV-stabiliser-B | 0.63 | 527 | 185.5 | 67.5 |
| + 2% of UV-stabiliser-B | 0.62 | 519 | 183.5 | 52.5 |

(a) The temperature at which a filament with a weight of 1.8 mg/dtex attached to it exceeds an extension of 0.8%/° C at a heating rate of 2.1° C/minute.
(b) The period of time (in seconds) after which a filament stretched by 100% breaks on a 2.5 cm wide metal support heated to 193° C.

EXAMPLE 5

2000 parts of a copolyester having an average molecular weight of 2000 of adipic acid, 1,6-hexane diol and 2,2-dimethyl-1,3-propane diol (molar ratio of the diols 65:35), are mixed at 40° C with 28.10 parts of N-methyl-bis-β-hydroxy propyl amine (66 mVal of tertiary amine/kg of solid substance) and a solution of 547.8 parts of diphenyl methane-4,4'-diisocyanate in 645 parts of dimethyl formamide, and the resulting mixture reacted for 90 minutes at 40 to 60° C to form an NCO-prepolymer (2.99% NCO, based on the solid substance).

3000 parts of the NCO-prepolymer solution are stirred over a period of 4 minutes into a suspension of 110 parts of rutile and 56.40 parts of ethylene diamine in 8460 parts of dimethyl formamide and 130 parts of solid carbon dioxide. Following the addition of 7.2 parts of 1,6-hexane diisocyanate, the solution has a viscosity of 700 poises/20° C and is subsequently divided up into solutions a. with no stabiliser added
b. with 1% of stabiliser 1a added
c. with 2% of stabiliser 1a added The solutions are dry spun. The filaments are run off at a rate of 250 meters per minute. After standing for 24 hours, filaments having a denier of approximately 140 dtex are subjected to heat treatment on heating godets (180° to 200° C) with a permitted shrinkage of about 10% by the process described in German Offenlegungsschrift No. 1,660,294. The results of measurements carried out on stabilised and unstabilised filaments after xenotesting for up to 340 hours are set out in Table 3.

Table 3

The influence of the stabilisers upon the stability to UV-light (xenotest) of dry-spun, thermally aftertreated elastomeric filaments (denier approximately 160 dtex)

Discoloration, tensile strength and elongation at break after xenotesting for x hours

| | before xenotesting | after 70 hours | after 143 hours | after 245 hours | after 340 hours |
|---|---|---|---|---|---|
| no stabiliser | 0.95/525 | 0.59/470 almost | 0.30/375 yellowish | 0.16/270 yellow | 0.14/220 bright yellow |

Table 3-continued

The influence of the stabilisers upon the stability to UV-light (xenotest) of dry-spun, thermally aftertreated elastomeric filaments (denier approximately 160 dtex)

Discoloration, tensile strength and elongation at break after xenotesting for x hours

|  | before xenotesting | after 70 hours | after 143 hours | after 245 hours | after 340 hours |
|---|---|---|---|---|---|
| + 1% of stabiliser 1a | 1.00/515 | colourless 0.96/480 colourless | 0.60/435 colourless | 0.37/375 colourless | 0.27/340 almost colourless, yellowish |
| +2% of stabiliser 1a | 1.04/525 | 0.98/490 colourless | 0.93/490 colourless | 0.62/450 colourless | 0.37/350 almost colourless |

EXAMPLE 6

An elastomer spinning solution was prepared in accordance with Example 5 from 2000 parts of polyester (molecular weight 2000), 38.26 parts of N-methyl-bis-(β-hydroxy propyl)-amine (approximately 100 mVal of tertiary amine/kg of solid substance) and 565.10 parts of diphenyl methane-4,4'-diisocyanate in 650 parts of dimethyl formamide. 3000 parts of the NCO-prepolymer (3.00% NCO) thus formed were chain-extended with 56.58 parts of ethylene diamine, 8461 parts of dimethyl formamide, 140 parts of solid carbon dioxide and 7.76 parts of 1,6-hexane diisocyanate, followed by the addition to the resulting spinning solution of 13 parts of acetanhydride for removing any residual terminal amino groups, and of 4% by weight of $TiO_2$ (in the solid substance).

The solution was divided up and the following stabilisers added, followed by dry spinning in the usual way:
a. no stabiliser added
b. 2% by weight of stabiliser (1a)
c. 1% by weight of stabiliser (1a) and 1% by weight of UV-stabiliser (A)
d. 1% by weight of stabiliser (1a) and 1% by weight of UV-stabiliser (B)
e. 2% by weight of m-compound, m.p.: 190°-191° C (cf. page 14, line 5 from the bottom)

When warped on sectional beams, elastomeric filaments containing addition e), (i.e. pure m-compound of the stabiliser type) show extremely troublesome abrasion attributable to separation of the addition at the surface of the filaments. UV-stabiliser (A) = Tinuvin 320/Ciba-Geigy [2-(2'-hydroxy-3',5'-di-tert.-butylphenyl)-benzotriazole] UV-stabiliser (B) = Tinuvin 327/Ciba-Geigy
[2-(2'-hydroxy-3',5'-di-tert.-butylphenyl)-5-chlorobenzotriazole]

UV-stabiliser (C) = 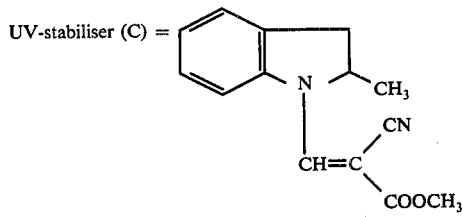

When used in quantities of 2%, the stabilisers according to Examples 2 and 3 have substantially the same stabilising effect as the stabiliser according to Example 1a, but are even more soluble and show extremely good compatibility with the polymers.

Table 4

The influence of stabilisers and of mixtures thereof with UV-stabilisers upon the stability of UV-light (xenotesting) of dry-spun elastomeric filaments (denier approximately 160 dtex)

Discoloration, tensile strength and elongation at break after xenotestin for x hours

|  |  | before xenotesting | after 305 hours |  |
|---|---|---|---|---|
| a) | without stabiliser | 0.85/515 | 0.24/364 | yellow |
| b) | +2% of stabiliser 1a | 0.81/515 | 0.48/460 | colourless |
| c) | 1% of stabiliser 1a + 1% of UV-stabliser (A) | 0.90/552 | 0.66/501 | colourless |
| d) | 1% of stabiliser 1a + 1% of UV-stabiliser (B) | 0.80/515 | 0.62/485 | colourless |

EXAMPLE 7

600 parts of a copolyester of adipic acid 1,6-hexane diol and 2,2-dimethyl-1,3-propane diol (molar ratio of the diols 65:35) (molecular weight of the copolyester 1615), 12 parts of N-methyl-bis-(β-hydroxy propyl)-amine, 169 parts of diphenyl methane-4,4-diisocyanate and 195 parts of dimethyl formamide are heated for 80 minutes at 50° to 54° C to form an NCO-prepolymer having an NCO-content of 2.38% (based on the solid substance).

322.5 parts of the above-mentioned NCO- prepolymer solution of 4 parts by weight of $TiO_2$ (based on the solid substance) are stirred into a solution of 11.8 parts of β-semicarbazido-propionic acid hydrazide in 23.6 parts of water at 50° C. diluted with 670 parts of dimethyl formamide, to form a viscous elastomer solution having a viscosity of 655 poises/20° C.

This solution is divided up into portions to which the following stabilisers are added:
a. no stabiliser added
b. 2% of stabiliser 1a
c. 1% of stabiliser 1a
d. 1% of stabiliser 1a + 1% of UV-stabiliser (B)
e. 2% of stabiliser II according to German OS 2,012,285 (α,α'-Bis-(2-hydroxy-3,5-dimethylphenyl)-1,4-diisopropylbenzene).

The solutions are cast into films which are simultaneously exposed to light in a Fadeometer.

Whereas film (a) is yellow in colour after only 22 hours, film (b) remains colourless for up to 66 hours in the Fadeometer. Film (c) shows signs of discoloration after 66 hours in the Fadeometer, film (d) is colourless like film b), whilst film (e) shows signs of yellowing after only 30 hours, becoming increasingly more yellow with continued exposure to light in the Fadeometer (up to 66 hours) (comparison test).

After boiling for 1 hour in boiling water and after solvent extraction for 15 minutes in boiling carbon tetrachloride, the stabilising effect has remained distinctly better intact in film (b). Serious discoloration only occurs after 66 hours in the Fadeometer, whereas comparison film (e) is seriously discolored after only 30 hours (during solvent extraction). The stabiliser in film (e) migrates to the surface during boiling and forms a coating on the films, which is not the case with stabiliser (b) according to the invention.

EXAMPLE 8

800 parts of polytetramethylene ether diol (molecular weight 1045) are reacted for 40 minutes at 35 to 50° C with 16.45 parts of N-methyl-bis-(β-hydroxy propyl)-amine and 285.9 parts of diphenyl methane-4,4-diisocyanate and 278 parts of dimethyl formamide, to form an NCO-prepolymer having an NCO-content of 2.09% (based on the solid substance).

1. Chain extension with ethylene diamine 5.24 parts of ethylene diamine and 895 parts of dimethyl formamide are converted into the carbamate suspension with 10 parts of solid carbon dioxide, 440 parts of the above-mentioned prepolymer solution are added over a period of 3 minutes, followed by pigmenting with 4% of $TiO_2$.

2. Chain extension with hydrazine hydrate 4.37 parts of hydrazine hydrate are dissolved with 895 g of dimethyl formamide and converted into the carbamate by the addition of 10 g of solid carbon dioxide. 425 parts of the above-mentioned NCO-prepolymer solution are introduced over a period of 3 minutes. The solution is subsequently pigmented with 4% by weight of $TiO_2$ (rutile).

The following stabilisers are added to both solutions:
a. no stabiliser added
b. 1% by weight of stabiliser 1a according to the invention + 1% by weight of light stabiliser (D)
c. 1% by weight of stabiliser 1a + 1% by weight of light stabiliser (D) + 2% by weight of light stabiliser according to Example 4 of German Patent Application P 25 20 814.4

The solutions are cast into films which are then Fadeometer-tested

D = light stabiliser corresponding to the formula
(Tinuvin 770 - Ciba-Geigy)

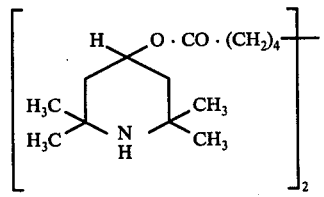

Whereas the unstabilised films are yellow in colour after only 8 hours (film 1a) and 15 hours (film 2a), had no strength (< 0.08 g/dtex) after 22 to 30 hours of Fadeometer-testing and showed serious surface-crazing, the stabilised films were colourless, showed no signs of degradation and were completely elastic without any surfacecrazing, even after 66 hours in the Fadeometer (the test was stopped after 66 hours). This level of stabilisation of the sensitive polyether ureas may be regarded as outstanding.

EXAMPLE 9

600 parts of a 1,6-hexane diol polycarbonate (molecular weight 1925) having an OH-number of 58.25 are heated for approximately 220 minutes to 97° C with 138.5 parts of 1-isocyanatomethyl-3,5,5-trimethyl cyclohexane and 185.5 parts of the aromatic hydrocarbon mixture known as "Solvesso-100", a product of the Shell company, resulting in the formation of a prepolymer solution having an NCOcontent of 3.58% (in the solid substance).

4.2 parts of diaminocyclohexane (17.3% of cis-isomer and 82.7% of trans-isomer) are introduced into 233 parts of solvess/ethylene glycol 1:1, followed by the introduction with stirring of 107.5 parts of the prepolymer solution. A homogeneous, storable solution having a viscosity of 266 poises at 20° C is obtained.

The films are cut into filaments which are exposed to the action of light in a Fadeometer.

In contrast to aromatic polyurethanes, the aliphatic polyurethane (used for preparations and coating compositions) remains colourless, even after prolonged exposure to light, but undergoes a decrease in its tensile strength. The stabiliser added in accordance with the invention considerably retards degradation.

Table 5

| | | Original | After 154 hours in the Fadeometer (cut filaments) |
|---|---|---|---|
| Tensile strength (g/dtex) discoloration | no stabiliser | 0.69 colourless | 0.29 colourless |
| Tensile strength (g/dtex) discoloration | + 2% of stabiliser | 0.69 colourless | 0.63 colourless |

EXAMPLE 10

The following stabilisers are incorporated in portions of the elastomer solution pigmented with $TiO_2$ in accordance with Example 4:
a. no stabiliser added
b. 2% of stabiliser 4 according to German Patent Application P 25 20 814.4
c. 2% of stabiliser 4 according to German Patent Application P 25 20 814.4 + 1% of stabiliser 1a (according to the invention)
d. 2% of stabiliser 4 according to German Patent Application P 25 20 814.4 + 2% of stabiliser 1a (according to the invention)

The solutions were cast into films, the films cut into rectangular filaments (approximately 280 dtex) and all the filaments simultaneously exposed to the action of light in a Fadeometer.

The improvements in colour stability and in retention of the mechanical and elastic properties (tensile strength and elongation at break) are shown in Table 6. It can be seen that, by adding the stabilisers according to the invention, it is possible to obtain a distinct increase in the stabilising effect by comparison with the stabilisers according to German Patent Application No. P 25 20 814.4.

Table 6

Tensile strength, elongation at break and discoloration of cut filaments after Fadeometer testing of polyester urethane urea elastomeric filaments

| | | before Fadeometer testing | after 8 hours | after 22 hours | after 44 hours | after 66 hour |
|---|---|---|---|---|---|---|
| a) | no stabiliser added | 0.59/628 | 0.45/590 yellow | 0.11/365 bright yellow | 0.07/140 bright yellow | — |
| b) | + 2% of stabiliser 4 according to P 25 20 814.4 | 0.58/617 | 0.56/60S colourless | 0.45/592 almost colourless | 0.29/525 yellowish/ yellow | 0.09/350 yellow |
| c) | + 2% of stabiliser 4 according to P 25 20 814.4 + 1% of stabiliser 1a (according to the invention) | 0.56/622 | 0.56/625 colourless | 0.54/625 colourless | 0.51/625 colourless | 0.39/574 almost colourless |
| d) | + 2% of stabiliser 4 according to P 25 20 814.4 + 2% of stabiliser 1a (according to the invention) | 0.65/652 | 0.62/647 colourless | 0.52/645 colourless | 0.54/635 colourless | 0.40/590 colourless |

We claim:

1. Polymer composition stabilised against degradation under the effect of light, heat and atmospheric influences, comprising a polyurethane polymer and from 0.01 – 10% by weight, based on the quantity of said polymer, of a mixture of α,α'-bis-(2-hydroxy-3,5-dialkyl phenyl)-m-diisopropyl benzene and α,α'-bis-(2-hydroxy-3,5-dialkyl phenyl)-p-diisopropyl benzene, the mixture containing 40 – 70% by weight of the m-compound.

2. A filament, fiber or film consisting essentially of the composition of claim 1.

3. A dry spun filament consisting essentially of the composition of claim 1.

* * * * *